(12) United States Patent
Noestheden (10) Patent No.: US 7,134,542 B1
(45) Date of Patent: Nov. 14, 2006

(54) MODULAR ACCUMULATING CONVEYOR SYSTEM

(75) Inventor: Andrew Noestheden, Tecumseh, CA (US)

(73) Assignee: Valiant Corporation, Windsor (CA)

( * ) Notice: Subject to any disclaimer, the term of this patent is extended or adjusted under 35 U.S.C. 154(b) by 0 days.

(21) Appl. No.: 11/251,951

(22) Filed: Oct. 17, 2005

(51) Int. Cl.
*B65G 17/18* (2006.01)
(52) U.S. Cl. ............... 198/800; 198/781.06; 198/465.4; 198/681
(58) Field of Classification Search ............ 198/860.2, 198/793, 797, 799, 800, 801, 465.2, 465.4, 198/781.04, 781.06, 465.3, 681, 683, 817, 198/343.1, 343
See application file for complete search history.

(56) References Cited

U.S. PATENT DOCUMENTS 5,013,203 A * 5/1991 Wakabayashi ........... 198/465.3
5,863,172 A * 1/1999 Pearson et al. ............. 198/801

* cited by examiner

*Primary Examiner*—James R. Bidwell
(74) *Attorney, Agent, or Firm*—Gifford, Krass, Groh, Sprinkle, Anderson & Citkowski, P.C.

(57) ABSTRACT

A conveyor system having a plurality of conveyor modules which are secured together in an end-to-end relationship. Each conveyor module includes a frame and a plurality of drive rollers rotatably mounted along one side of the frame, and a motor mounted to the frame is drivingly connected to the drive rollers. A first upper guide is also mounted to the frame at a position spaced upwardly from the drive rollers. At least one work support includes a lower rail supported by the drive rollers and an upper follower slidably positioned within the upper guide.

19 Claims, 6 Drawing Sheets

MODULAR ACCUMULATING CONVEYOR SYSTEM

BACKGROUND OF THE INVENTION

I. Field of the Invention

The present invention relates generally to conveyors and, more particularly, to a modular accumulating conveyor system.

II. Description of Related Art

There are many previously known accumulating conveyor systems of the type used in industrial manufacturing facilities. Such conveyor systems used in industrial manufacturing facilities are employed to move workpieces sequentially between workstations. Additionally, a manufacturing or assembly operation of some sort is typically performed at each workstation.

The previously known industrial accumulating conveyor systems have typically been custom designed and manufactured in accordance with the customer specifications for a particular conveyor system. The custom design, manufacture and installation of these previously known industrial conveyors, however, resulted in several disadvantages.

A primary disadvantage of these previously known custom accumulating conveyor systems is that such conveyor systems were necessarily expensive to design and construct. This additional cost of the conveyor system is attributable to the engineering and labor costs associated with the customized design of each individual conveyor system.

A still further disadvantage of these previously known custom accumulating conveyor systems is that, since each accumulating conveyor system was unique and different from the other, the repair and maintenance of the conveyor systems was relatively high, even if having some standard common parts.

A still further disadvantage of these previously known custom industrial conveyor systems is that it was difficult, if not altogether impossible, to modify the conveyor system for a different industrial application, requiring by example a different work altitude or simply more operator workstations. As a result, it was often necessary to simply scrap the entire conveyor system and install a brand new conveyor system when a change in the application for the conveyor system occurred.

A still further disadvantage of these previously known industrial conveyor systems is that many such systems utilize an overhanging conveyor to move the part along the conveyor system. As such, it was difficult ergonomically for assemblers along the conveyor system to access all sides of the part being conveyed.

A still further disadvantage of these previously known industrial conveyors is that all of the wiring, piping and fluid lines necessary for the operation of the conveyor were typically mounted to the exterior of the frame. As such, these various components of the overall conveyor system presented an aesthetically unappealing appearance for the overall conveyor system.

SUMMARY OF THE PRESENT INVENTION

The present invention provides an accumulating conveyor system which overcomes all of the above-mentioned disadvantages of the previously known industrial accumulating conveyor systems.

In brief, the present invention provides a modular accumulating conveyor system having a plurality of substantially identical floor-mounted conveyor modules which are secured together in an end-to-end relationship to form the conveyor system. Consequently, the overall conveyor system may be either lengthened by adding more modules, or shortened by eliminating modules, in accordance with the conveyor system requirements.

Each conveyor module includes a frame having a plurality of first drive rollers rotatably mounted along one side of the frame and, similarly, a plurality of second drive rollers rotatably mounted along the opposite side of the frame. A drive motor associated with each module is drivingly connected to both the first and second drive rollers to rotatably drive the first and second drive rollers in synchronism with each other. The first and second drive rollers, furthermore, are preferably accumulating drive rollers.

A first upper guide is mounted to the frame at a position spaced upwardly from the first drive rollers. Similarly, a second upper guide is also mounted to the frame at a position spaced upwardly from the second drive rollers.

At least one work support has a lower rail which is supported on and propelled by the drive rollers. An upper follower is mounted to the work support and slidably positioned within the upper guide. In the conventional fashion, workpieces on which the manufacturing or assembly operations are performed are detachably mounted to the work support and sequentially propelled along the conveyor system between sequential workstations by the drive rollers.

Preferably, a turntable is associated with each end of the conveyor system and this turntable is pivotal between a first position and a second position about a vertical axis. The turntable includes a plurality of turntable rollers as well as a turntable guide positioned above the turntable rollers. Furthermore, in its first position, the turntable rollers are aligned with the first drive rollers and, simultaneously, the turntable guide is aligned with the first upper guide. Conversely, in its second position, the turntable rollers are aligned with the second drive rollers and, simultaneously, the turntable guide is aligned with the second upper guide. Consequently, in operation, once a work support is propelled into the turntable, pivotal movement of the turntable from its first and to its second position effectively moves the work support from one side of the conveyor system to the other side of the conveyor system.

Since the overall conveyor system is constructed from a plurality of substantially identical modules, the overall length of the conveyor system may be increased or decreased as desired by simply adding or removing conveyor modules from the conveyor system. Furthermore, since the conveyor modules are substantially identical to each other, they may be reused as required in different modular conveyor systems. Maintenance of the conveyor system is also simplified since individual conveyor modules may be replaced as required with only minimal down time for the conveyor system.

The overall frame of the present invention is preferably made from tubular beams. As such, all of the electrical lines, pipes, fluid lines and the like required in the operation of the conveyor system are preferably routed through the interior of the tubular frame. This, in turn, provides an overall aesthetically pleasing appearance for the conveyor system.

A still further advantage of the present invention is that the part conveyed is mounted to a pallet which protrudes laterally outwardly from the side of the conveyor system. This pallet, in turn, may be rotatably mounted about a vertical axis to the conveyor system. Consequently, assemblers or other workmen performing operations on the parts conveyed by the conveyor system are able to easily and freely access all sides of the part conveyed. As such, the conveyor system of the present invention provides an ergonomically superior conveyor system as compared to the previously known conveyor systems.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
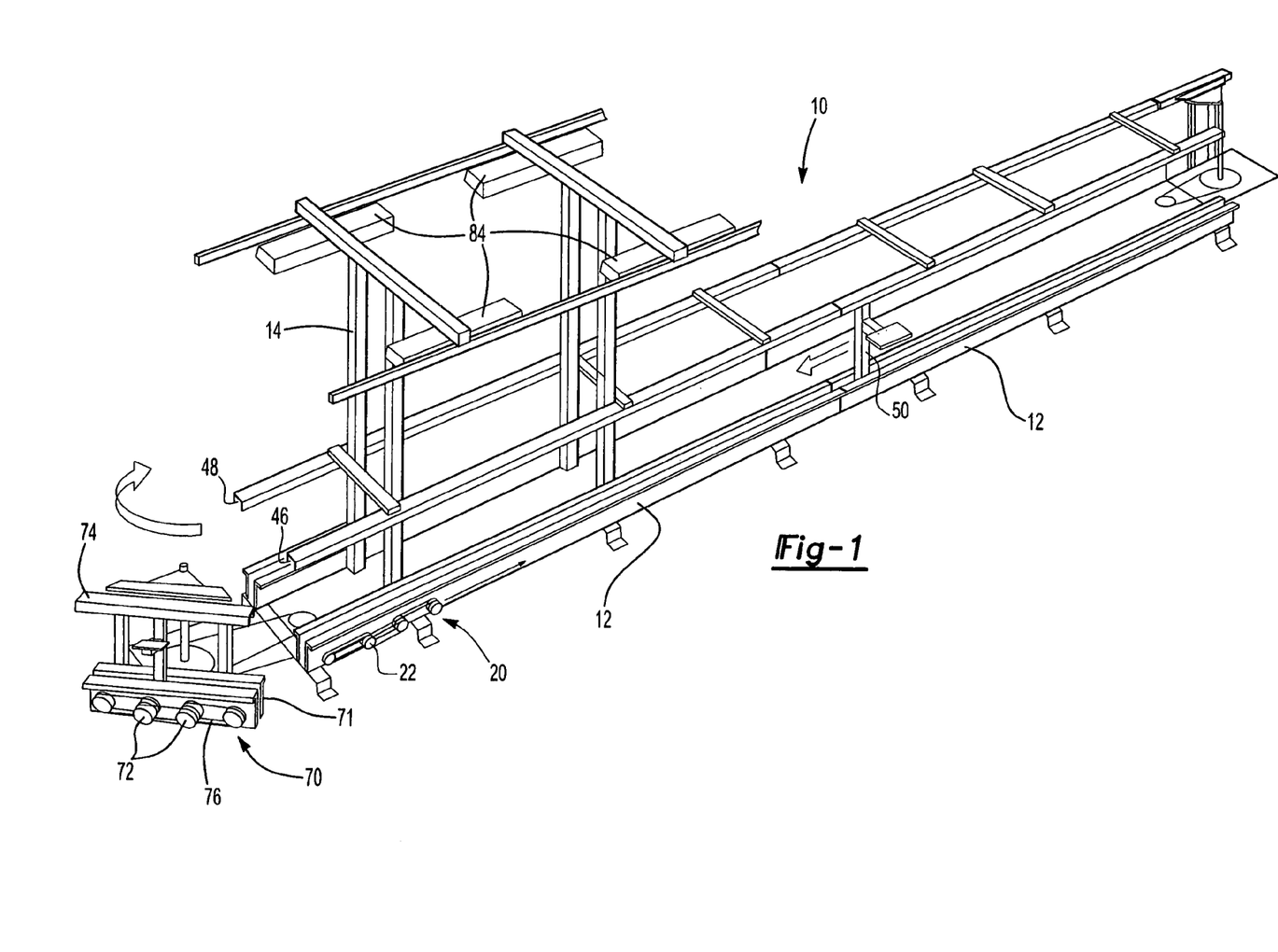
FIG. 1 is an elevational view illustrating a preferred embodiment of the present invention.
Figure 2:
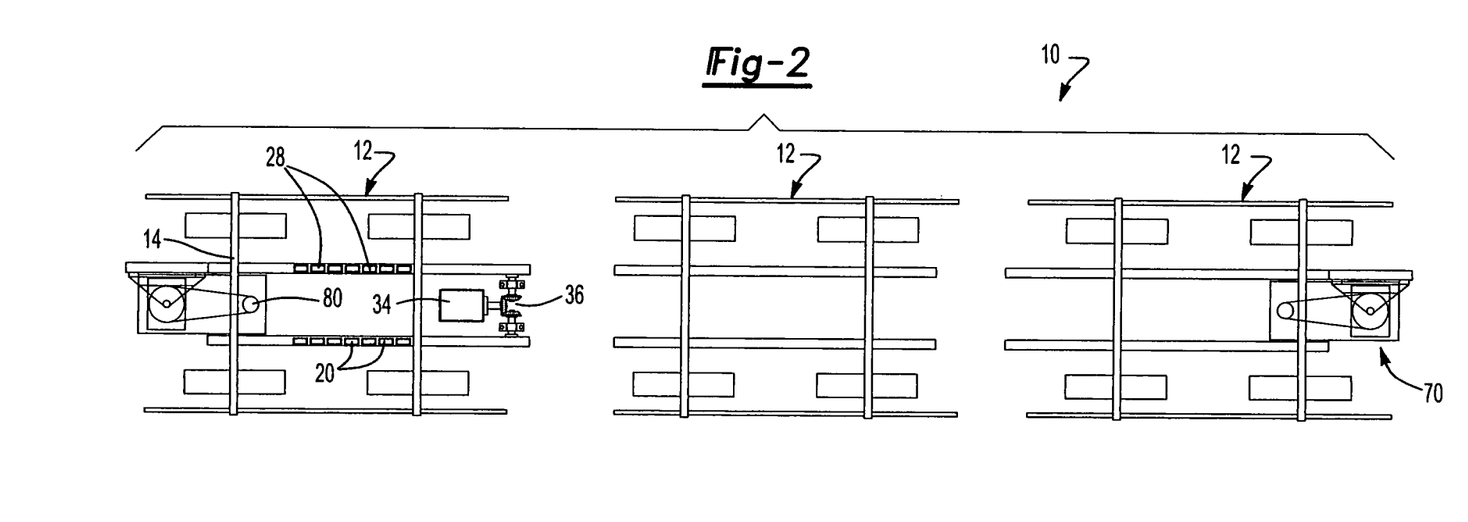
FIG. 2 is a top exploded and partially diagrammatic view of the preferred embodiment of the present invention.

With reference first to FIGS. 1 and 2, a preferred embodiment of the conveyor system 10 of the present invention is shown. The conveyor system 10 comprises a plurality of conveyor modules 12, each of which are substantially identical to each other. Consequently, only a single conveyor module 12 will be described in detail, it being understood that a like description shall apply to the other conveyor modules 12.

Figures 4, 6:
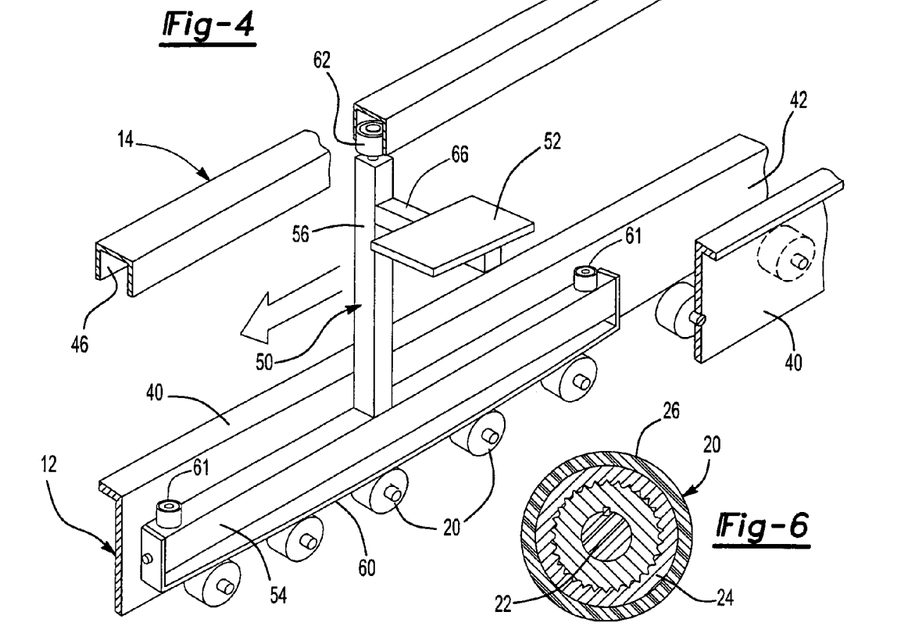
FIG. 4 is a fragmentary elevational view illustrating a portion of the preferred embodiment of the present invention.
FIG. 6 is a sectional view of one friction drive roller.

With reference now particularly to FIGS. 1, 2 and 4, each conveyor module 12 includes a frame 14 which is constructed of any suitable material, such as metal tubing. The individual components of the frame 14, furthermore, are secured together by conventional means so that the frame 14 is a rigid frame.

Figure 10:
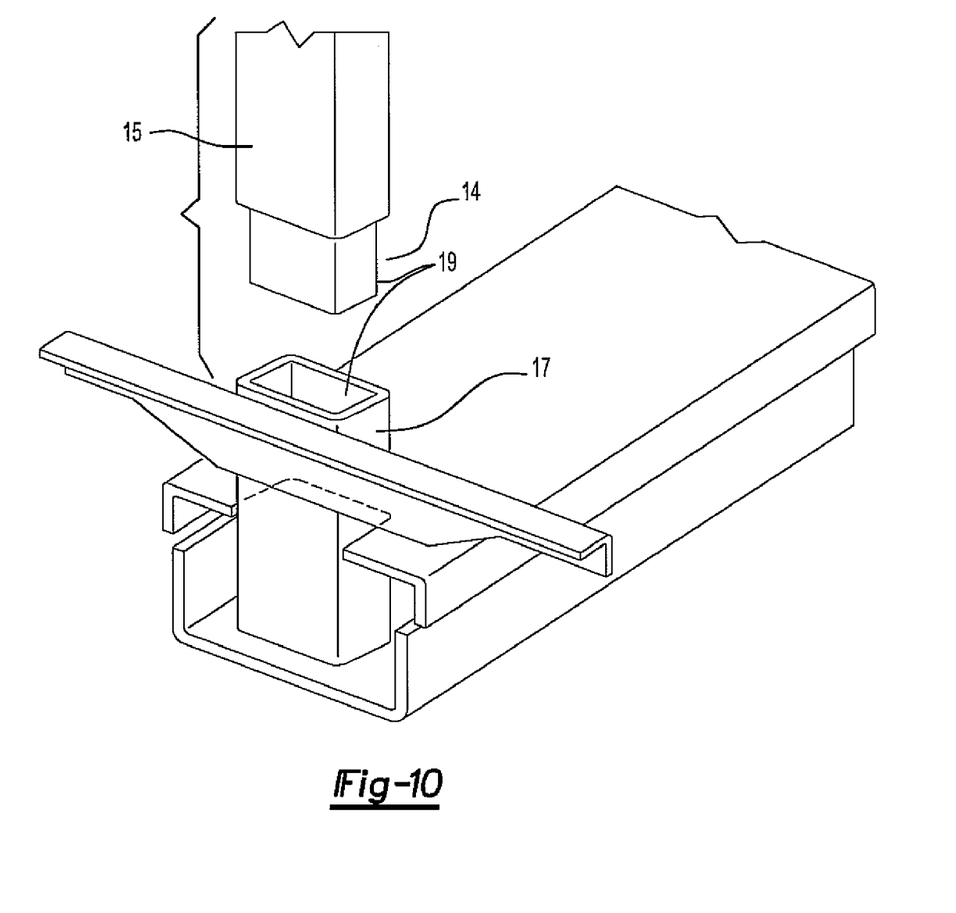
FIG. 10 is a fragmentary view illustrating a portion of the frame.

As best shown in FIG. 10, vertical components 15 and 17 of the frame 14 are assembled together by a tube and socket attachment 19. This enables component shipping and facilitates final assembly.

Figure 5:
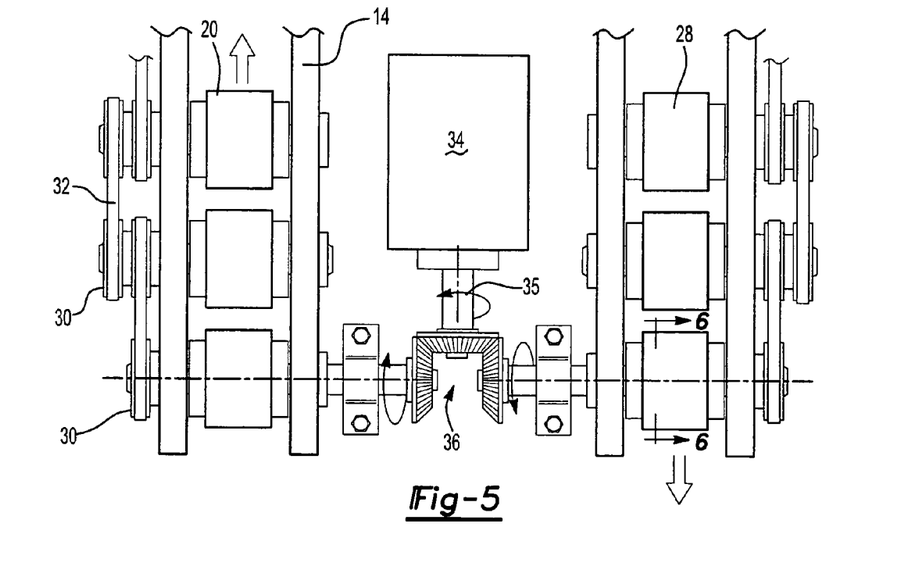
FIG. 5 is an elevational view illustrating the drive mechanism of the preferred embodiment of the present invention.

As best shown in FIGS. 4 and 5, a plurality of first drive rollers 20 are each rotatably mounted to the frame 14 adjacent the bottom of the frame 14. The axes of the rollers 20 are spaced apart and linearly aligned with each other. Any conventional bearing means may be used to rotatably mount the rollers 20 to the frame 14.

With reference now particularly to FIG. 6, a cross section of a single roller 20 is there shown in greater detail and includes a driveshaft 22 having a drive member 24 attached to the shaft 22 so that the drive member 24 rotates in unison with the driveshaft 22. Conversely, an outer driven member 26 of the drive roller 20 is disposed around, but not secured to, the drive member 24. Consequently, when weight is applied to the drive roller 20, the drive member 24 will rotatably drive the driven member 26 due to the frictional engagement between the drive member 24 and driven member 26. Conversely, the driven member 26 may be held stationary despite the continued rotation of the shaft 22 and drive member 24. When this occurs, the drive member 24 merely rotates within the interior of the driven member 26.

As best shown in FIG. 5, the plurality of first drive rollers 20 are provided along one side of the conveyor module frame 14 while second drive rollers 28 are rotatably mounted to the frame 14 on the opposite side of the frame 14. The first drive rollers 20 are substantially identical to the second drive rollers 28.

A drive sprocket 30 is attached to each driveshaft 22 for both the first drive rollers 20 as well as the second drive rollers 28. These drive sprockets 30 are, in turn, rotatably driven together by conventional drive chains 32. Furthermore, although the drive rollers 20 and 28 are preferably rotatably driven together by a chain 32, it will be understood that other types of drive mechanisms, such as belts and pulleys, may alternatively be used without deviation from the spirit or scope of the present invention.

Still referring to FIG. 5, a motor 34, which is preferably an electric motor, is mounted to the frame 14 for each conveyor module 12. An output shaft 35 from the motor 34 is drivingly connected to the drive rollers 20 and 28 through a transmission 36. Preferably, the transmission 36 comprises a bevel gear drive arrangement.

Figures 7, 9:
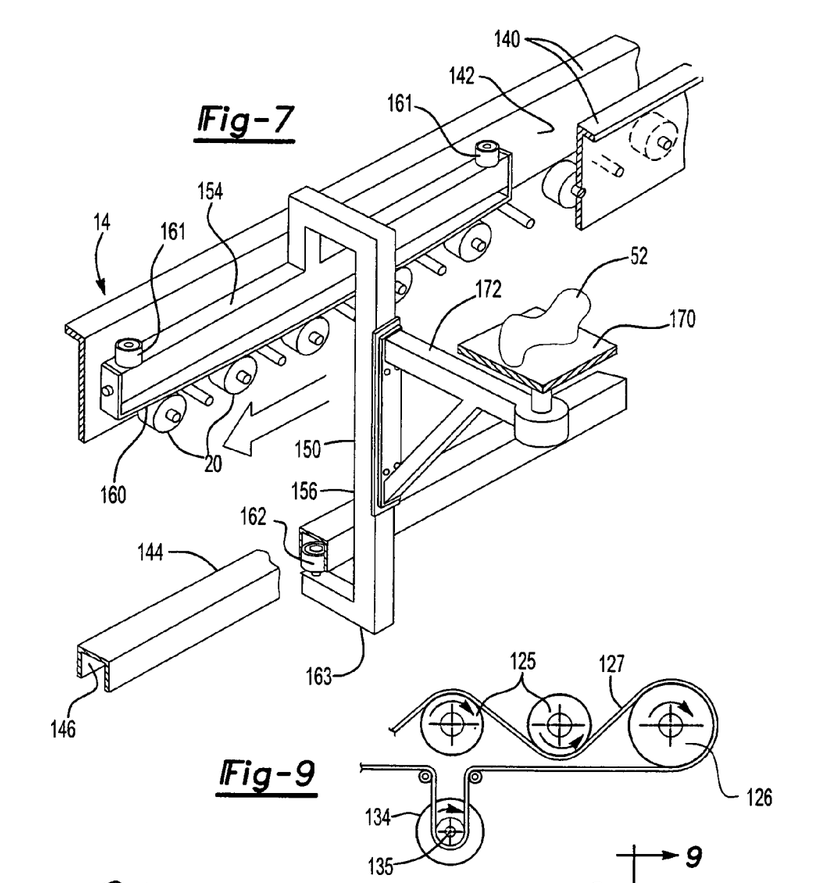
FIG. 7 is a fragmentary elevational view illustrating a second preferred embodiment of the present invention.
FIG. 9 is a fragmentary end view illustrating a second preferred embodiment of the drive system of the present invention.
Figure 8:
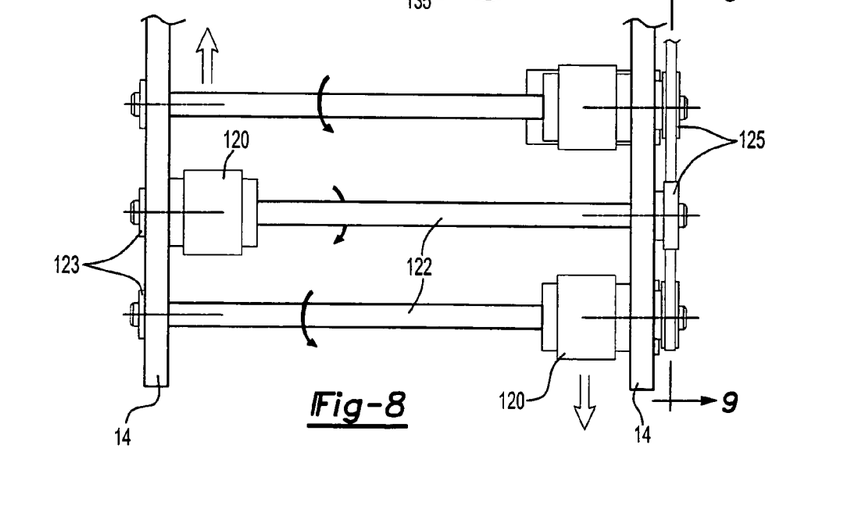
FIG. 8 is a fragmentary top view illustrating a second preferred embodiment of the drive system of the present invention.

With reference now to FIGS. 8 and 9, a second preferred embodiment of the roller drive system is shown. A plurality of driveshafts 122 are rotatably mounted to the conveyor frame by conventional bearing assemblies 123 so that the axles 122 extend entirely laterally across the frame 14. An accumulating drive roller 120 is then secured to each driveshaft 122 such that the rollers 120 alternate on opposite sides of the conveyor frame 14. These rollers 120, furthermore, are substantially identical to the rollers 20 illustrated in FIG. 6 so that a further description thereof is unnecessary.

Still referring to FIGS. 8 and 9, a drive sprocket or pulley 125 is attached to one end of each driveshaft 122 along only one side of the conveyor frame 14. An elongated drive member 127, such as a drive chain or drive pulley, is then wound about opposite sides of the drive sprockets 125 and this drive member 127 is, in turn, driven by an output shaft 135 of a drive motor 134. However, since the drive member 127 engages the drive sprockets 125 in an alternating fashion, upon activation of the motor 134, the drive chain 127 rotatably drives the rollers 120 along one side of the frame 14 in one direction and the rollers 120 along the opposite side of the frame in the opposite direction.

Referring now to FIG. 9, an end drive sprocket 126 is larger in diameter than the other drive sprockets 125. The drive sprocket 126, while rotating at a slightly slower speed than the other drive sprockets 125, prevents interference with the drive member 127.

With reference now particularly to FIG. 4, the frame 14 includes a pair of spaced apart and vertically extending panels 40 which extend upwardly along opposite sides of the drive rollers 20. These panels 40, together with the rollers 20, thus form a substantially U-shaped guide channel 42 along the bottom of each conveyor module 12. Similar panels are also provided along the opposite side of the conveyor module 12 for the second drive rollers 28.

An elongated first upper guide 44 is secured to the frame 14 above the channel 42 and preferably aligned with the channel 42. The first upper guide 44 includes a downwardly facing U-shaped channel 46. A substantially identical second upper guide 48 (FIG. 1) is also attached to the frame 14 along the opposite side of the conveyor module 12.

Still referring to FIG. 4, an exemplary work support 50 which holds an exemplary workpiece 52 is shown and includes an elongated lower rail 54 as well as a vertically extending rail 56 secured to and extending upwardly from the lower rail 54. The lower rail 54 has a width less than the space in between the panels 40 such that the lower rail 54 fits within the channel 42.

An elongated flexible runner 60 is secured to and extends along the bottom of the lower rail 54 of the work support 50. This runner 60, due to its flexibility, ensures that a portion of the runner 60 maintains consistent contact with a plurality of the drive rollers 20.

A follower 62, such as a roller, is secured to the top of the vertical rail 56 of the work support 50. This follower 62 is slidably positioned within the channel 46 of the upper guide 44.

Consequently, in operation, the side panels 40 constrain the lower rail 54 against lateral movement through two cam followers 61 while, similarly, the coaction between the upper guide 44 and the follower 62 constrains the work support 50 from lateral movement at its upper end. However, the entire work support 50 is free to slide longitudinally along the drive rollers 20. In doing so, the workpiece 52 secured to the work support 50 by a horizontal strut 66 is longitudinally movable along the conveyor system 10.

With reference now to FIG. 7, an alternate embodiment of the present invention is shown in which the frame 14 includes a pair of spaced apart panels 140 which extend downwardly along each side of the conveyor frame 14 from a position adjacent the top of the conveyor frame 14. The panels 140 thus form a channel 142 therebetween and the rollers 20 (or 120) are disposed along the bottom of the channel 142.

Still referring to FIG. 7, a work support 150 includes a vertical strut 156 with an elongated upper rail 154 attached to the upper end of the vertical support. The rail 154 is dimensioned to fit into the channel 142 and be supported by the rollers 20. An elongated flexible runner 160 is also secured to the bottom of the rail 154 to ensure substantially constant contact between the runner 160 and all of the rollers 20.

A pair of guide rollers 161 are also rotatably attached at opposite ends of the guide rail 154 so that the rollers 161 rotate about a vertical axis. These rollers 161 selectively engage the facing sides of the panels 140 and thus minimize frictional contact between the rail 154 and the guide panels 140 while securely retaining the rail 154 in the channel 142.

An elongated guide channel 144 having a downwardly facing U-shaped channel 146 is also secured to the frame 14 such that the guide channel 144 is below the guide panels 140. A cylindrical follower 162 is rotatably mounted to a horizontal strut 163 attached to the lower end of the vertical strut 156 so that the follower 162 is positioned within the U-shaped channel 146. Consequently, the guide rail 154, together with the follower 162 and their associated panels 140 and guide channel 144, locks the work support 150 against lateral movement relative to the frame 12 while simultaneously allowing the work support 150 to travel freely longitudinally along the conveyor system 10.

Still referring to FIG. 7, in one exemplary embodiment, the workpiece 52 is supported on a pallet 170 which, in turn, is rotatably mounted about a vertical axis to a support strut 172 which protrudes outwardly from the vertical strut 156. Consequently, in operation, workmen, installers and the like operating on the workpieces 52 transported by the conveyor system are able to freely access all sides of the workpiece 52 in an ergonomically advantageous fashion.

Figure 3:
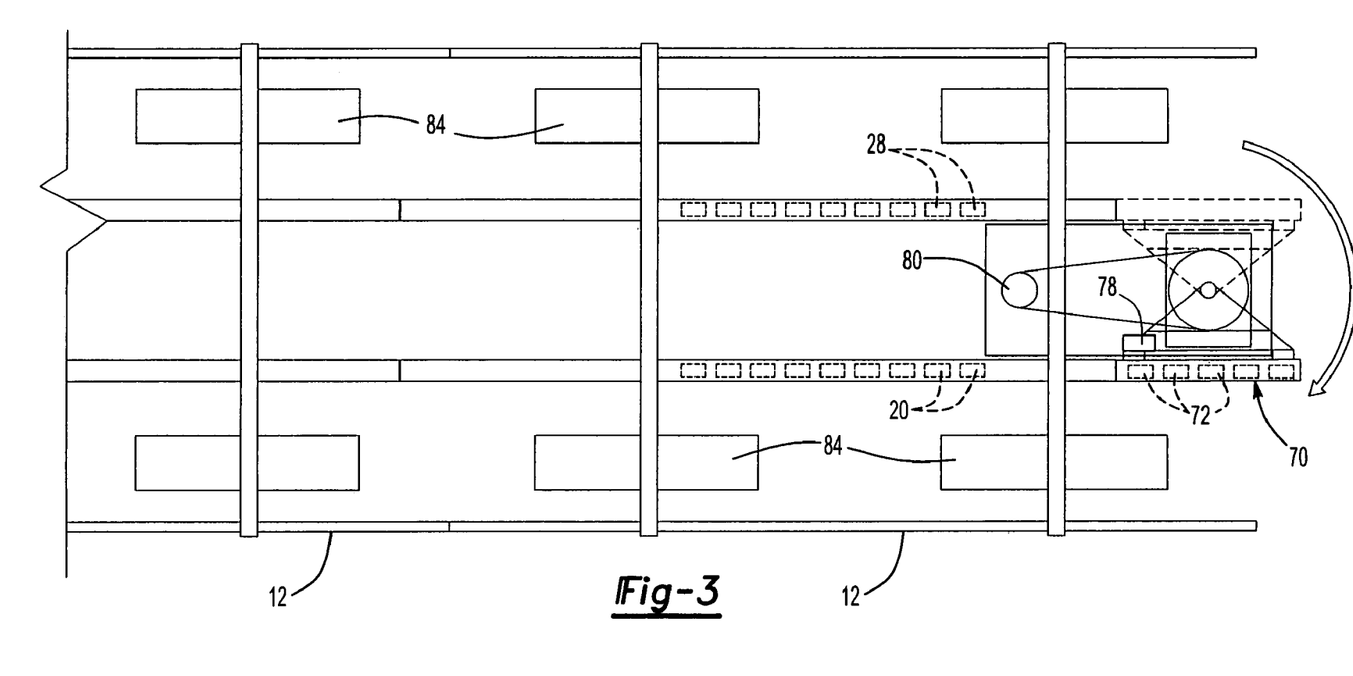
FIG. 3 is a view similar to FIG. 2, but illustrating the operation of the turntable.

With reference now particularly to FIGS. 1 and 3, a turntable 70 is associated with one or both ends of the conveyor system 10. The turntable 70 includes a frame 71 having a plurality of turntable rollers 72 mounted to the frame 71. The turntable 70 also includes a turntable upper guide 74 mounted to the turntable frame 71 above the rollers 72.

The turntable rollers 72 are rotatably driven together by drive chain 76 (FIG. 1). A drive motor 78 is then drivingly connected to one of the turntable rollers 72 in any conventional fashion such that the turntable rollers 72 are rotatably driven in unison with each other. The turntable rollers 72 are substantially identical to the drive rollers 20 and, thus, are accumulating rollers.

With reference now particularly to FIG. 3, the turntable 70 is pivotal about a vertical axis between a first position, illustrated in solid line in FIG. 3, and a second position, illustrated in phantom line in FIG. 3. In its first position, the turntable rollers 72 are aligned with the first drive rollers 20 and, simultaneously, as best shown in FIG. 1, the turntable guide 74 is aligned with the upper guide 44 above the first drive rollers 20. Consequently, a work support 50 conveyed by the first conveyors 20 will convey the work support 50 onto the turntable rollers 72.

Conversely, in a second position as best shown in FIG. 3, the turntable rollers 72 are aligned with the drive rollers 28 on the opposite side of the conveyor module 12. Simultaneously, as best shown in FIG. 1, the turntable upper guide 74 is aligned with the upper guide associated with the drive rollers 28. In this position, an article support may be conveyed from the turntable 70 and onto the drive rollers 28.

Any conventional means, such as an electric motor 80 (FIG. 3), may be used to pivot the turntable 70 between its first and second positions. Likewise, any conventional stop mechanism may be employed with the turntable 70 to hold the work support 50 on the turntable 72 as the turntable 72 is pivoted between its first and second position. Likewise, conventional limit switches are preferably used to initiate the pivotal action of the turntable 70 between its first and its second position.

With reference now particularly to FIG. 1, one or more lamps 84 are preferably mounted to the frame 14 so that at least one lamp 84 illuminates each side of the conveyor module 12. The electric wiring for the lamps 84 preferably extends through one or more of the tubular framing members used to construct the frame 14.

In addition, any piping or fluid lines necessary for the operation of the overall conveyor system are also preferably routed through the interior of the tubular framing members utilized to construct the frame 14.

In operation, two or more conveyor modules 12 are secured together in an end-to-end relationship utilizing conventional fasteners. Furthermore, the desired length of the overall conveyor system 10 will dictate the number of conveyor modules 12 utilized to form the conveyor system 10.

After the modules are secured together and the turntable 70 optionally mounted to one or both ends of the conveyor system 10, activation of the motors 34 in each module will simultaneously drive all of the conveyor drive rollers 20 and 28. Consequently, with the work support 50 supported by the drive rollers 20 or 28 and with its follower 62 mounted in the upper guide 44, the work support 50 is conveyed from one end of the conveyor system 10 and toward the other end. However, since the drive rollers 20 and 28 are accumulating drive rollers, the work support 50 may be stopped and held stationary at any desired workstation despite the continued rotation of the motor 34 associated with that conveyor module 12.

Once the work support 50 reaches the end of the conveyor system 10, the work support 50 is conveyed onto the turntable 70. After the work support 50 is positioned on the turntable 70, the turntable 70 is activated to pivot the turntable 70 from its first and to its second position. Thereafter, the turntable motor 78 conveys the work support off of the turntable 70 and onto the guide rollers 20 or 28 on the opposite side of the conveyor system 10.

From the foregoing, it can be seen that the present invention provides a modular conveyor system in which the overall length of the conveyor system may be easily changed by merely selecting the appropriate number of conveyor modules 12 to assemble the conveyor system 10. Furthermore, since each conveyor module 12 is substantially identical to the other conveyor modules, the number of different repair and maintenance components for the entire conveyor system 10 is minimized. Furthermore, in the event of a serious malfunction of any individual conveyor module 12, the damaged or malfunctioning conveyor module 12 may be simply removed from the conveyor system 10 and replaced by a new conveyor module 12 whereupon operation of the overall conveyor system 10 may resume.

A still further advantage of the present invention is that, since the workpiece is supported on a pallet which protrudes laterally outwardly from the conveyor frame, all sides of the workpiece may be easily accessed by the workmen or other installers operating on the workpieces. As such, the present invention provides an ergonomically superior conveyor system.

A still further advantage of the present invention is that, since the electrical wiring, piping and other fluid lines required in the operation of the conveyor system are routed through the interior of the tubular frame, the conveyor system of the present invention provides an overall aesthetically pleasing appearance.

Having described my invention, however, many modifications thereto will become apparent to those skilled in the art to which it pertains without deviation from the spirit of the invention as defined by the scope of the appended claims.

I claim:

1. A conveyor system comprising:
   a plurality of conveyor modules secured together in an end-to-end relationship, each conveyor module comprising:
   a frame,
   an elongated lower guide channel extending along one side of said frame,
   an elongated upper guide channel spaced upwardly from said lower guide channel,
   a plurality of first drive rollers rotatably mounted to said frame along one side of said frame, said rollers being disposed in one of said guide channels,
   a motor drivingly connected to said first drive rollers,
   at least one work support having a rail positioned in said one guide channel and said rail being supported by said drive rollers, and
   a follower slidably positioned in the other of said guide channels.

2. The invention as defined in claim 1 and comprising an elongated second lower guide channel extending along the other side of said frame, an elongated second upper guide channel spaced upwardly from said second lower guide channel, a plurality of second drive rollers rotatably mounted to said frame and disposed in one of said second guide channels, said motor being drivingly connected to said second drive rollers, and a second follower slidably positioned in the other of said second guide channels.

3. The invention as defined in claim 2 wherein said motor is drivingly connected to said first and second drive rollers through a bevel gear arrangement.

4. The invention as defined in claim 1 wherein said first drive rollers are accumulating drive rollers.

5. The invention as defined in claim 2 wherein said second drive rollers are accumulating drive rollers.

6. The invention as defined in claim 1 and comprising a flexible runner mounted to said work support so that said runner extends along a bottom of said work support lower rail.

7. The invention as defined in claim 1 and comprising two vertical axis cam followers attached on top of both end of said rail to reduce friction against said elongated lower guide.

8. The invention as defined in claim 2 and comprising a turntable attached to an end conveyor module and pivotable between a first and a second position about a vertical axis.

9. The invention as defined in claim 8 wherein said turntable comprises a plurality of turntable rollers, said turntable rollers being aligned with said first drive rollers when said turntable is in said first position and said turntable rollers being aligned with said second drive rollers when said turntable is in said second position.

10. The invention as defined in claim 9 and comprising a turntable motor drivingly connected to said turntable rollers.

11. The invention as defined in claim 9 wherein said turntable comprises a turntable guide, said turntable guide being aligned with said first upper guide when said turntable is in said first position and said turntable guide being aligned with said second upper guide when said turntable is in said second position.

12. The invention as defined in claim 1 and comprising at least one lamp secured to said frame above said first upper guide.

13. The invention as defined in claim 12 wherein said frame includes at least one tubular framing member and wherein electrical power wires associated with said lamp extend through said tubular framing member.

14. The invention as defined in claim 1 wherein said work support comprises a laterally outwardly extending strut and a work support pallet mounted to a lateral outer end of said work support.

15. The invention as defined in claim 14 wherein said pallet is rotatably mounted to said laterally outwardly extending strut about a vertical axis.

16. The invention as defined in claim 2 and comprising a plurality of drive axles which extend laterally across said frame, said first drive rollers being attached to alternating drive axles and said second drive rollers are attached to the other drive axles, wherein adjacent drive axles are driven in opposite rotational directions.

17. The invention as defined in claim 16 wherein said motor drives said first and second drive axles through an elongated flexible drive member.

18. The invention as defined in claim 17 wherein said drive member comprises a drive chain.

19. The invention as defined in claim 16 wherein a drive sprocket is attached to each drive axle, said drive member being drivingly connected to said drive member, and wherein an end drive sprocket has a greater diameter than the other drive sprockets.

* * * * *